(12) United States Patent
Henry et al.

(10) Patent No.: US 6,640,933 B2
(45) Date of Patent: Nov. 4, 2003

(54) LUBRICATION SYSTEM FOR A BEARING

(75) Inventors: Mark Stephen Henry, Indianapolis, IN (US); Steven Robert Wellborn, Indianapolis, IN (US)

(73) Assignee: Rolls Royce Corporation, Indianapolis, IN (US)

( * ) Notice: Subject to any disclaimer, the term of this patent is extended or adjusted under 35 U.S.C. 154(b) by 0 days.

(21) Appl. No.: 09/902,410

(22) Filed: Jul. 10, 2001

(65) Prior Publication Data

US 2003/0010572 A1 Jan. 16, 2003

(51) Int. Cl.⁷ ................................................. F16C 1/24
(52) U.S. Cl. ......................... 184/5.1; 184/6.23; 384/462
(58) Field of Search ............................... 184/5.1, 6.23, 184/105.1; 384/462, 466, 467, 468, 471, 473

(56) References Cited

U.S. PATENT DOCUMENTS

| | | | |
|---|---|---|---|
| 2,986,433 A | | 5/1961 | Herrmann |
| 3,004,806 A | | 10/1961 | Schinnerer |
| 3,666,049 A | * | 5/1972 | Kern et al. .................... 184/14 |
| 3,708,215 A | * | 1/1973 | Wilcock et al. ............. 384/102 |
| 3,779,345 A | * | 12/1973 | Barnes et al. .............. 184/6.11 |
| 4,502,274 A | * | 3/1985 | Girault ....................... 184/6.11 |
| 4,621,710 A | | 11/1986 | Tsukamoto et al. |
| 4,755,103 A | * | 7/1988 | Streifinger ................. 184/6.11 |
| 5,113,818 A | | 5/1992 | Bonde et al. |
| 5,207,291 A | | 5/1993 | Mezzedimi et al. |
| 5,251,725 A | | 10/1993 | Barrett, Jr. |
| 5,301,771 A | | 4/1994 | Sishtla et al. |
| 5,404,964 A | | 4/1995 | Zinsmeyer et al. |
| 5,439,361 A | | 8/1995 | Reynolds et al. |
| 5,456,475 A | * | 10/1995 | Abraham et al. ........... 210/171 |
| 6,098,583 A | | 8/2000 | Gordon |

FOREIGN PATENT DOCUMENTS

| | | | |
|---|---|---|---|
| EP | 369878 A1 | * 5/1990 | ........... F16C/33/76 |
| JP | 8-284961 | 11/1996 | |

* cited by examiner

Primary Examiner—William C Joyce
Assistant Examiner—Timothy McAnulty
(74) Attorney, Agent, or Firm—Barnes & Thornburg

(57) ABSTRACT

A lubrication system is provided for use with a bearing including an outer race, an inner race, and bearing elements disposed therebetween. Rotation of the bearing and a shaft journaled thereby induces air movement having a first air velocity and a path adjacent the bearing. The lubrication system includes a structure providing a passageway through which a lubricant entrained in gas is delivered at a second velocity to the bearing. The lubrication system further includes a flow modifier disposed relative to the bearing and the structure to modify the first air velocity to promote movement of the lubricant into the bearing.

29 Claims, 5 Drawing Sheets

LUBRICATION SYSTEM FOR A BEARING

TECHNICAL FIELD

The invention relates to lubrication of a bearing and more particularly to dispensing a lubricant entrained in a gas into the bearing to lubricate the bearing. The invention is disclosed in the context of lubricating a bearing of a gas turbine engine. The invention is believed to be useful in other applications as well.

BACKGROUND AND SUMMARY

Lubrication systems for application to rotary elements, such as bearings, are known. See, for example, U.S. Pat. Nos. 2,986,433; 3,004,806; 4,502,274; 4,621,710; 5,113,818; 5,207,291; 5,251,725; 5,301,771; 5,404,964; 5,439,361; 6,098,583. The disclosures of those references are hereby incorporated herein by reference. No representation is intended that a complete search has been made of the prior art or that no better art than that listed is available, and no such representation should be inferred. This listing shall not be construed to be an admission that the listed references are, or are considered to be, material to patentability.

Some lubrication systems use gas-entrained lubricant to lubricate bearings coupled to a shaft. For example, mist lubrication systems use gas-entrained lubricant but are generally limited to applications characterized by a Dn value of less than or equal to 2.0 million millimeters-revolutions per minute (or mm-rpm), wherein Dn is defined as the product of the bearing bore diameter measured in millimeters and the angular velocity of the shaft measured in revolutions per minute. This is because rotation of the bearing and the shaft in Dn applications above 2.0 million mm-rpm induces a chaotic, turbulent flow field adjacent the bearing, thereby threatening ingress of low-momentum, gas-entrained lubricant particles into the bearing. Thus, it is desirable to have a lubrication system configured to lubricate a bearing using gas-entrained lubricant in high Dn applications above 2.0 million mm-rpm.

A lubrication system is disclosed herein for use with a bearing comprising an outer race, an inner race, and bearing elements disposed therebetween. Rotation of the bearing and a shaft journaled thereby about a central axis induces air movement having a first air velocity and a path adjacent the bearing. The lubrication system comprises a structure providing a passageway through which gas-entrained lubricant is delivered at a second velocity to the bearing and a flow modifier disposed relative to the bearing and the structure to modify the first air velocity to promote movement of the lubricant into the bearing.

In illustrative embodiments, the lubrication system further comprises a lubricant dispenser configured to dispense gas-entrained lubricant through an outlet into the bearing. The flow modifier is configured to slow the first air velocity relative to the velocity of the gas-entrained lubricant so that the gas-entrained lubricant dispensed from the outlet reaches the bearing to lubricate the bearing. The flow modifier comprises a screen structure comprising first baffles arranged in series about the shaft and a pair of second baffles coupled to at least one of the first baffles. The second baffles cooperate to define a space therebetween in which the outlet is disposed.

The present invention comprises, therefore, a screen structure disposed adjacent a bearing to modify the induced air flow. Illustratively, the screen structure will slow the induced air flow. Preferably, the screen structure will slow the induced air flow so that the velocity of the induced air flow is less than or equal to the velocity of the gas-entrained lubricant. The screen structure is provided with spaces into which nozzles are disposed. The nozzles are configured to dispense the gas-entrained lubricant onto the inner race of the bearing. The first baffles are disposed in the flow field of the induced air flow and are provided with a plurality of apertures through which the induced air movement can flow.

Illustratively, each second baffle comprises a base provided with a plurality of apertures through which the induced air movement can flow and a tang coupled to the base and extending toward the bearing. In illustrative embodiments, each tang is configured to block the flow of the induced air movement through the tang. In other illustrative embodiments, each tang is provided with a plurality of apertures through which the induced air movement can flow. Each nozzle is disposed between a pair of tangs.

Additional features and advantages of the infant care unit will become apparent to those skilled in the art upon consideration of the following detailed descriptions exemplifying the best mode of carrying out the apparatus as presently perceived.

BRIEF DESCRIPTION OF THE DRAWINGS

The illustrative apparatus will be described hereinafter with reference to the attached drawings which are given as non-limiting examples only, in which.

Corresponding reference characters indicate corresponding parts throughout the several views. The exemplification set out herein illustrates an embodiment of the apparatus and such exemplification is not to be construed as limiting the scope of this application in any manner.

DETAILED DESCRIPTION OF THE DRAWINGS

Figure 1:
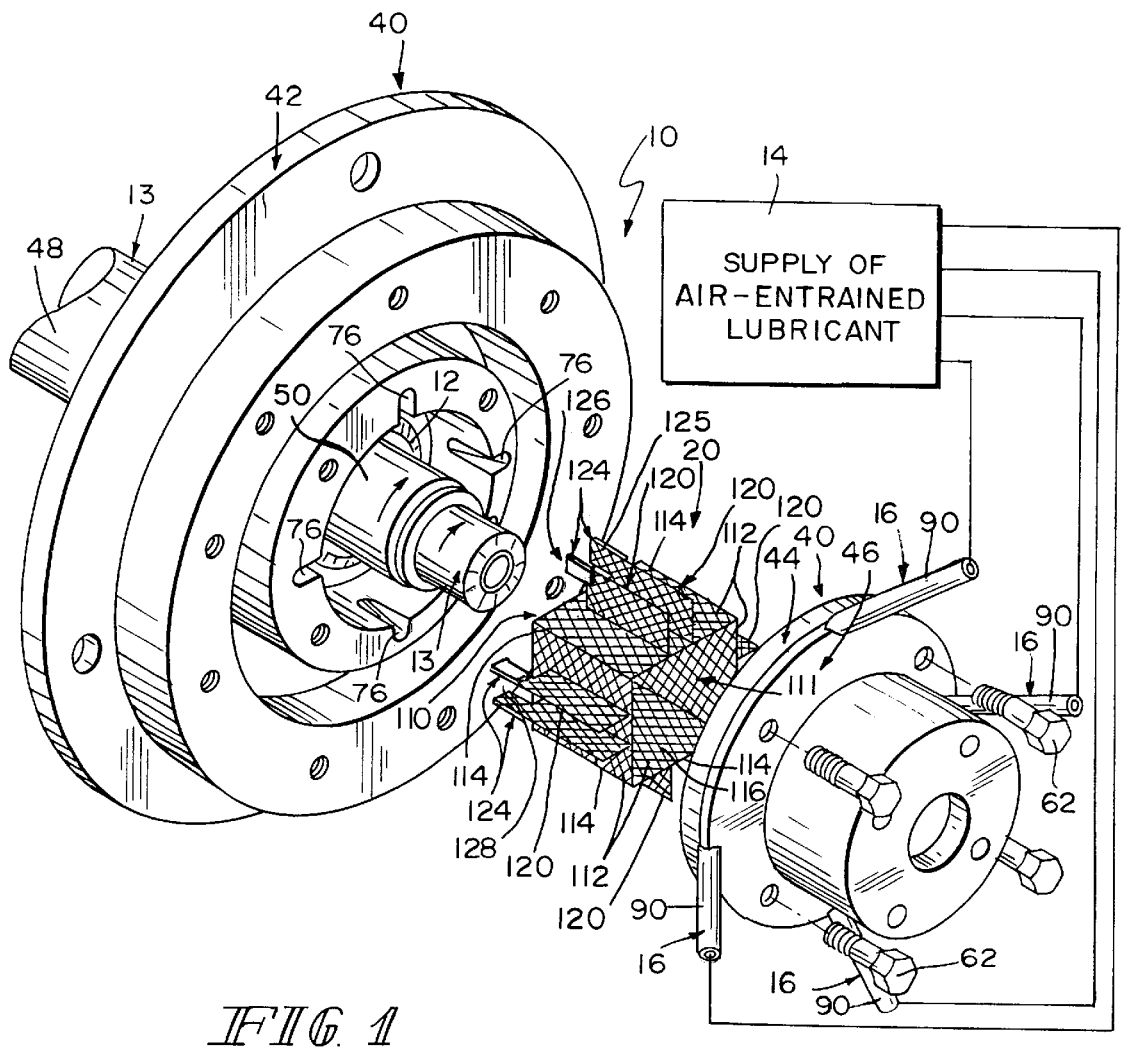
FIG. 1 is an exploded perspective view of an apparatus comprising a lubrication system comprising a flow modifier and lubricant dispensers, a bearing, a shaft, and a test rig.

A lubrication system 10 using air-entrained oil lubricant for elasto-hydrodynamic film lubrication of a bearing 12 coupled to a rotatable shaft 13 is shown, for example, in FIGS. 1–4. Lubrication system 10 includes a supply 14 of air-entrained lubricant, four lubricant dispensers or nozzles 16 configured to dispense individual jets 17 of the air-entrained lubricant at a lubricant velocity onto an inner race 18 of bearing 12 to lubricate bearing 12, and a screen structure or flow modifier 20 disposed in an interior region 22 about shaft 13 and adjacent bearing 12, as shown, for example, in FIGS. 1–3.

In illustrative embodiments, bearing 12 is an auxiliary or "back-up" bearing of a magnetic suspension system of a gas turbine engine and lubrication system 10 is configured to lubricate bearing 12 while on board the gas turbine engine. In this application, bearing 12 and shaft 13 are designed to operate at a high Dn value of 2.3 million mm-rpm in a 500° F. environment. In the absence of flow modifier 20, such rotation of bearing 12 and shaft 13 induces chaotic, turbulent air movement (or windage) having an air velocity and a path adjacent bearing 12 which impedes ingress of low-momentum, air-entrained lubricant particles into bearing 12. The induced air movement includes an air flow path that is adjacent bearing 12 and, while often somewhat chaotic, is generally circumferential about a central axis 54.

Flow modifier 20 is designed to accommodate this high Dn application. Flow modifier 20 is disposed in interior region 22 adjacent bearing 12, as shown, for example, in FIGS. 2–4. This is to modify the air movement induced by rotation of bearing 12 and shaft 13 to promote ingress of the low-momentum, air-entrained lubricant particles from nozzle outlets 24 through a jet space 26 between nozzle outlets 24 and inner race 18 onto inner race 18. Jets 17 of the low-momentum, air-entrained lubricant particles are generally orthogonal to the circumferential air flow path of the induced air movement. Flow modifier 20 is configured to reduce the air velocity relative to the lubricant velocity so that the lubricant velocity is about equal to or greater than the air velocity. It is believed that flow modifier also somewhat streamlines the induced air movement.

Figure 2:
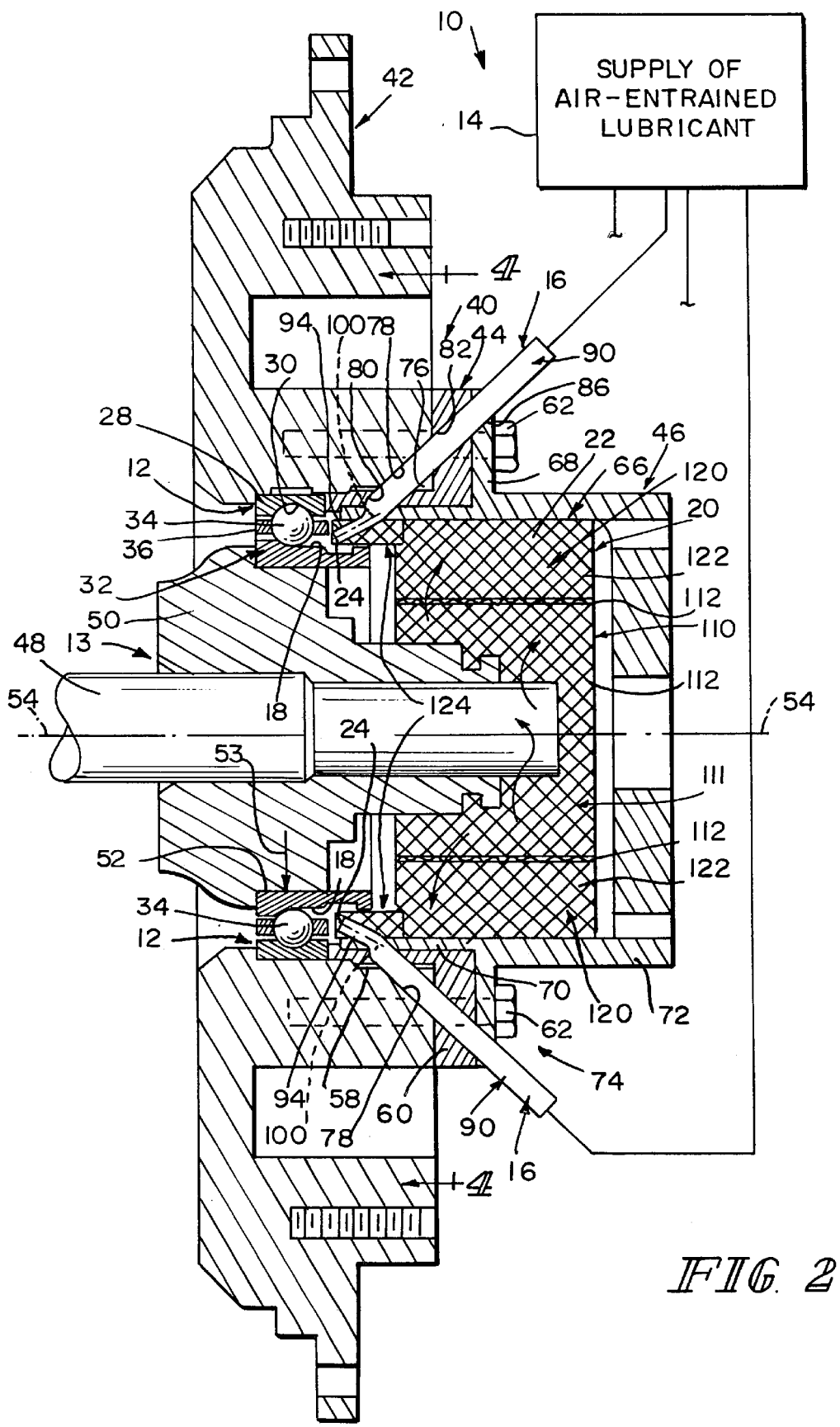
FIG. 2 is a side elevation and partial cross-sectional view of the apparatus of FIG. 1.
Figure 3:
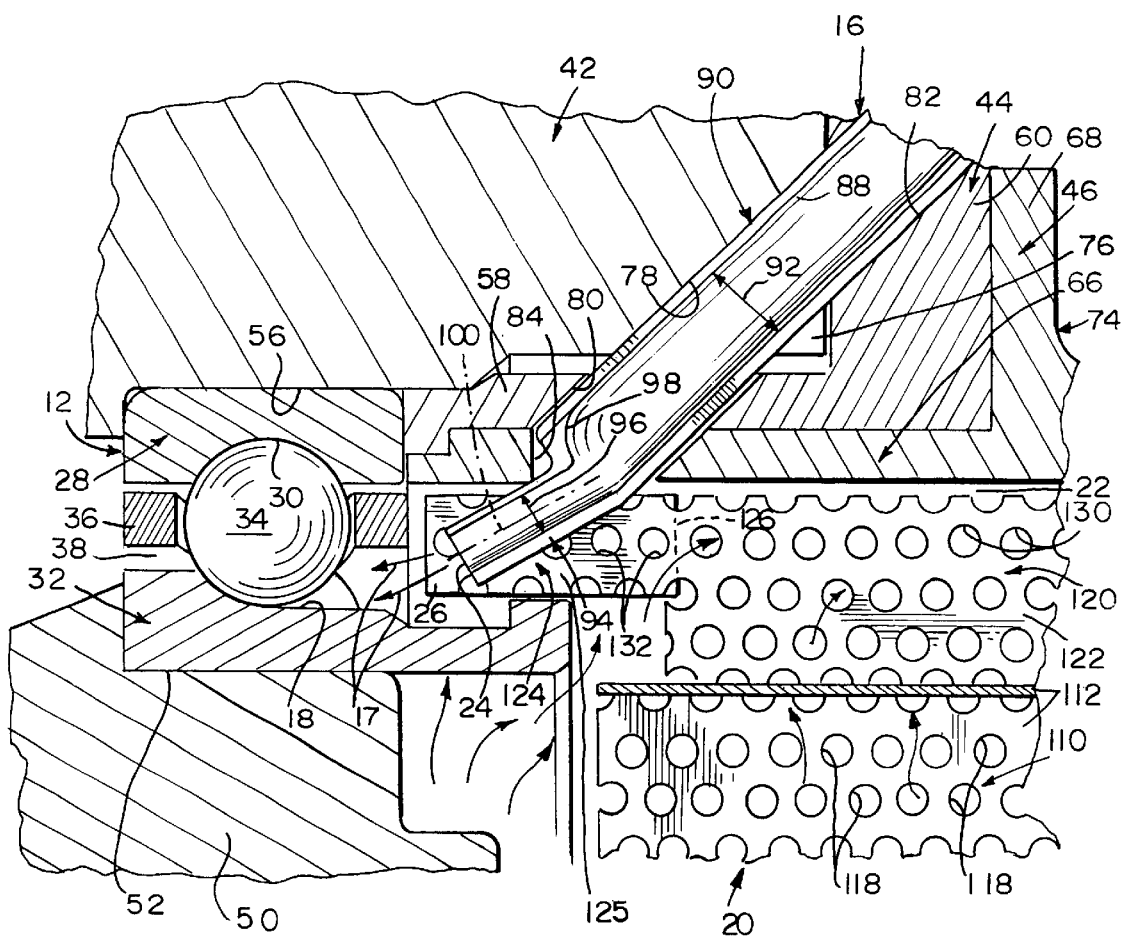
FIG. 3 is an enlarged side elevation and partial cross-sectional view of the apparatus of FIG. 2.

Bearing 12 includes an outer ring 28 including an outer race 30, an inner ring 32 including inner race 18, and bearing elements 33 including balls 34 and a separator 36, as shown, for example, in FIGS. 2 and 3. Balls 34 and ball separator 36 are disposed in a bearing space 38 defined by outer and inner rings 28, 32. In preferred embodiments, bearing 12 is an angular contact bearing.

Lubrication system 10 and bearing 12 are shown, for example, in FIGS. 1–5 as being coupled to a test rig 40 designed to model gas turbine engine components associated with lubrication system 10 and bearing 12. Rig 40 includes shaft 13, an engine sump or bearing housing 42, a bearing retainer plate 44, and a support 46.

Shaft 13 includes a shaft central body 48 and a shaft collar 50 fixed to shaft central body 48 and interconnecting shaft central body 48 and inner ring 32, as shown, for example, in FIG. 2. Inner ring 32 defines a shaft-receiving bore 52 having a bore diameter 53 and shaft 13 is disposed in shaft-receiving bore 52. Inner ring 32 is fixed to shaft collar 50 to rotate with shaft 13 about central axis 54 extending through shaft central body 48.

Outer ring 28 abuts an inner surface 56 of bearing housing 42 and is fixed to bearing retainer plate 44, as shown, for example, in FIGS. 2 and 3. Bearing retainer plate 44, in turn, is fixed to bearing housing 42 to fix outer ring 28 to bearing housing 42. Bearing retainer plate 44 includes an axially extending sleeve 58 fixed to outer ring 28 and a flange 60 extending radially outwardly from sleeve 58 and fixed to bearing housing 42 by bolts 62.

Support 46 is configured to support flow modifier 20 in interior region 22 so that flow modifier 20 is centered on central axis 54, as shown, for example, in FIGS. 2 and 3. Support 46 includes an axially extending sleeve 66 and a flange 68 extending radially outwardly from sleeve 66. Sleeve 66 defines interior region 22 in which flow modifier 20 is disposed. Sleeve 66 includes an axially inner section 70 disposed radially inwardly of and in contact with sleeve 58 of bearing retainer plate 44 and an axially outer section 72. Flange 68 is disposed between inner and outer sections 70, 72 and, along with flange 60 of bearing retainer plate 44, is fixed to bearing housing 42 by bolts 62.

Bearing retainer plate 44 and support 46 cooperate to form a nozzle holder 74 configured to hold nozzles 16 in position to dispense air-entrained lubricant into bearing 12, as shown, for example, in FIGS. 1–3. Nozzle holder 74 cooperates with nozzle-receiving grooves 76 formed in bearing housing 42 to form four nozzle-receiving channels 78 configured to position nozzles 16 at 90° intervals circumferentially about central axis 54. Sleeve 58 of bearing retainer plate 44 is formed to include nozzle-receiving apertures 80. Flange 60 of bearing retainer plate 44 is formed to include nozzle-receiving apertures 82. Inner sleeve section 70 of support 46 is formed to include nozzle-receiving apertures 84. Flange 68 of support 46 is formed to include nozzle-receiving apertures 86. Each of nozzle-receiving apertures 80, 82, 84, 86 is sized to receive one of nozzles 16. Nozzle-receiving apertures 80, 82, 84, 86 cooperate with respective nozzle-receiving grooves 76 to form nozzle-receiving channels 78. Each nozzle 16 is disposed in one of nozzle-receiving channels 78.

Each nozzle 16 is disposed in fluid communication with air-entrained lubricant supply 14 and is oriented by nozzle holder 74 to dispense the air-entrained lubricant onto inner race 18 for lubrication of bearing 12, as shown, for example, in FIGS. 1–3. Each nozzle 16 is formed to includes a passageway 88 and includes a nozzle body 90 including a larger diameter 92, a nozzle throat 94 including a smaller diameter 96 and one of nozzle outlets 24, and a reducer 98 interconnecting nozzle body 90 and nozzle throat 94. Each nozzle 16 is configured to accelerate the air-entrained lubricant through its nozzle throat 94 to dispense the air-entrained lubricant from its nozzle outlet 24 at a lubricant velocity. Each nozzle throat 94 defines a nozzle throat axis 100 which is angled relative to central axis 54. In preferred embodiments, each nozzle throat axis 100 is angled to permit lubricant to enter bearing 12 on central axis 54.

Figure 4:
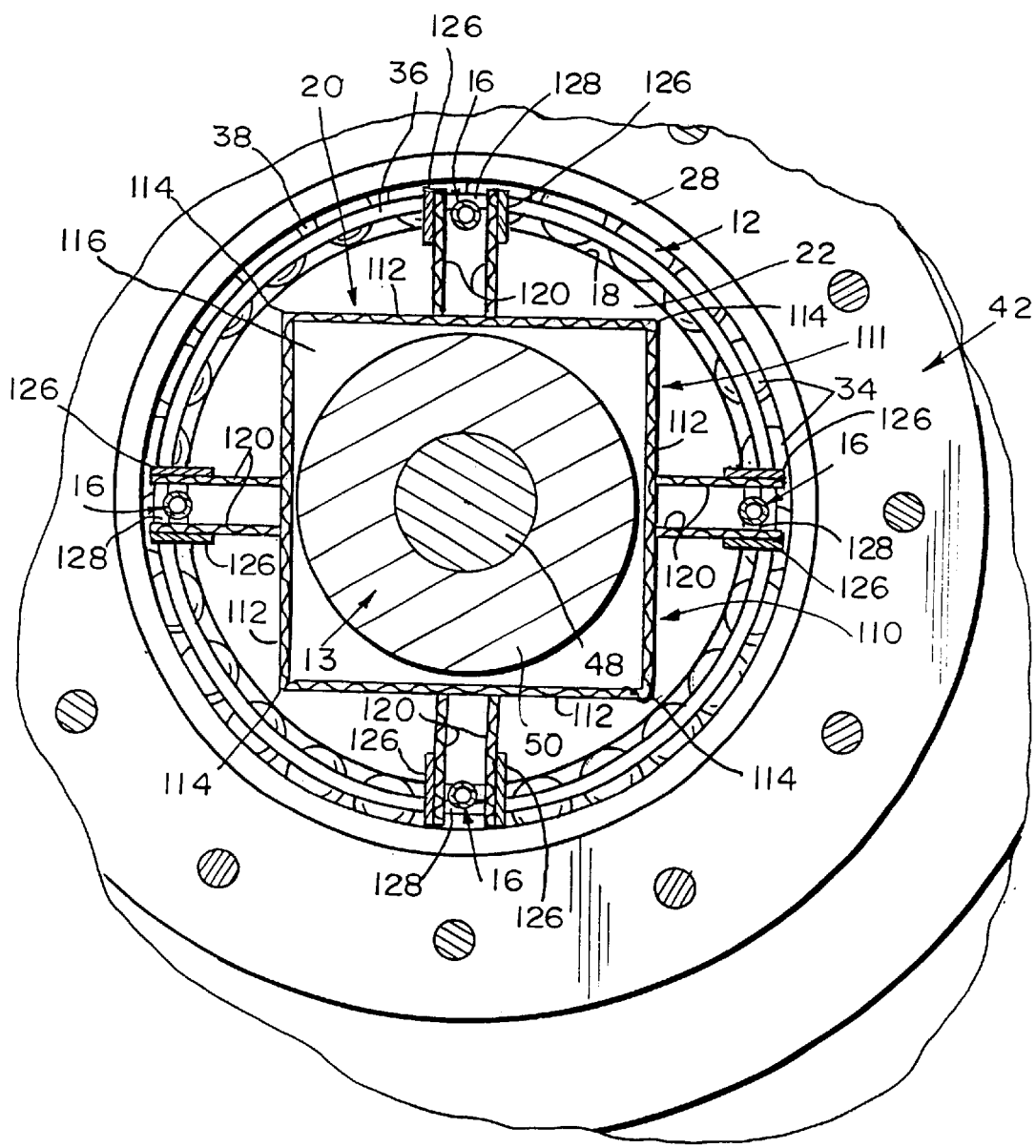
FIG. 4 is an elevation view taken along lines 4—4 of FIG. 2 showing the flow modifier in cross-section.
Figure 5:
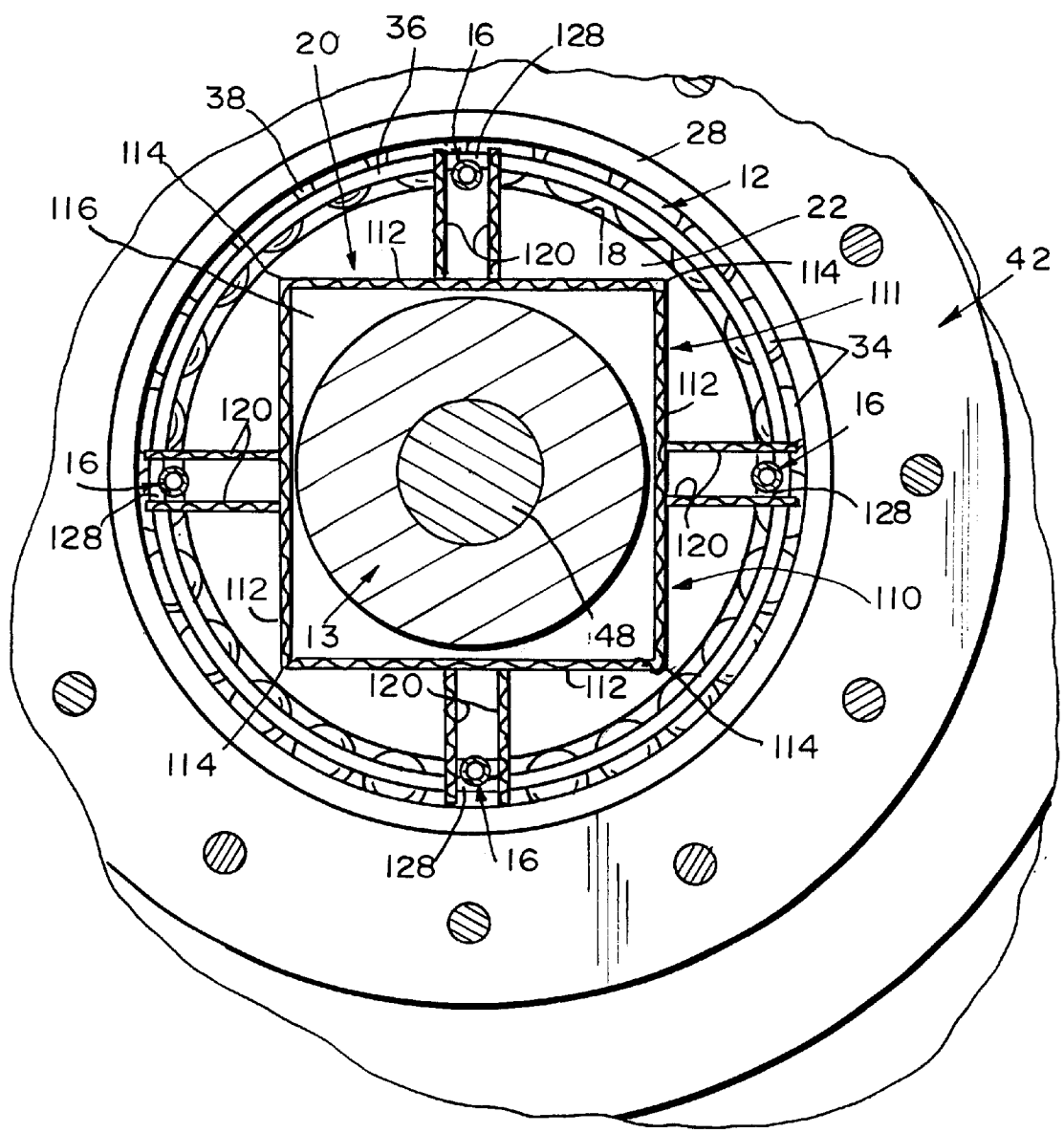
FIG. 5 is an elevation view of another embodiment of the flow modifier of FIG. 4.

Flow modifier 20 is disposed in interior region 22 and is fixed to support 46, as shown, for example, in FIGS. 2–4. Flow modifier 20 includes a perforated structure 111 including four perforated first baffles or panels 112 configured to inhibit the induced air movement to slow the air velocity, as shown, for example, in FIGS. 1–4. Each panel 112 is generally planar and rectangle-shaped and is disposed generally parallel to central axis 54. Adjacent panels 112 are disposed generally perpendicularly to one another and are coupled together along an edge 114. Each edge 114 is generally parallel to central axis 54 and coupled to sleeve 66 to position and support flow modifier 20 in interior region 22.

Panels 112 are arranged in series about shaft 13 and central axis 54. Panels 112 cooperate with one another to form an outer boundary of a shaft-receiving interior region 116 in which shaft 13 is disposed for rotation. Each panel 112 is formed to include apertures 118 permitting the induced air movement to flow therethrough in a somewhat streamlined, ordered fashion. In preferred embodiments, each panel 112 is a perforated plate.

Flow modifier 20 further includes four pairs of second baffles or fins 120 coupled to sleeve 66, as shown, for example, in FIGS. 1–4. Fins 120 are also configured to inhibit the induced air movement to slow the air velocity. Each pair of fins 120 is coupled to one of panels 112 so that the fin pairs are spaced at 90° intervals about central axis 54. Each fin 120 is disposed generally perpendicularly to respective panel 112 to which it is coupled and is disposed outside of shaft-receiving interior region 116. Each fin extends outwardly away from central axis 54 and axially relative to central axis 54 toward bearing 12. Fins 120 of each fin pair are disposed in spaced-apart, generally parallel relation to one another. In preferred embodiments, each fin 120 is a perforated screen.

Each fin 120 includes a perforated base 122 coupled to one of panels 112 and a tang 124 coupled to perforated base 122, as shown, for example, in FIGS. 1–3. Each of perforated base 122 and tang 124 is generally rectangle-shaped. Each perforated base 122 is formed to include apertures 130 permitting the induced air movement to pass through apertures 130 in a somewhat streamlined, ordered fashion.

Each tang 124 extends away from respective perforated base 122 toward bearing 12, as shown, for example, in FIGS. 1–3. Tangs 124 of each fin pair cooperate with one another to define a nozzle-receiving space 128 in which one of nozzle throats 94 is disposed.

Each tang 124 includes a perforated member 125 coupled to and disposed in generally co-planar relation with perforated base 122 and a cover 126 fixed to perforated member 125 to close apertures 132 formed in perforated member 125 to block the induced air movement from passing through tang 124, as shown, for example, in FIGS. 1–4. Apertures 132 are closed to promote movement of the air-entrained lubricant from respective nozzle outlet 24 through respective jet space 26 to inner race 18, as shown, for example, in FIG. 3. In preferred embodiments, covers 126 are removed from perforated members 125 to expose apertures 132 to the air induced movement for passage of the air induced movement therethrough, as shown, for example, in FIG. 5.

Although the foregoing embodiments have been described, one skilled in the art can easily ascertain the essential characteristics of the apparatus, and various changes and modifications may be made to adapt the various uses and characteristics without departing from the spirit and scope of this application, as described by the claims which follow.

What is claimed is:

1. A lubrication system for use with a bearing comprising an outer race, an inner race, and bearing elements disposed therebetween, the bearing defining a central axis, rotation of the bearing and a shaft journaled thereby inducing air movement having a first air velocity and a path adjacent the bearing, the lubrication system comprising:
    a structure providing a passageway through which a lubricant entrained in gas is delivered at a second velocity to the bearing,
    a flow modifier disposed relative to the bearing and the structure to modify the first air velocity to promote movement of the lubricant into the bearing, and
    wherein the flow modifier includes a screen structure to inhibit the induced air movement, thereby reducing the first air velocity.

2. The lubrication system of claim 1, wherein the screen structure includes a perforated plate that inhibits the induced air movement so that the second velocity of the lubricant is at least as great as the first air velocity.

3. The lubrication system of claim 1, wherein the screen structure comprises first baffles arranged in series about the bearing axis in the path of the induced air movement.

4. The lubrication system of claim 3, wherein the screen structure comprises a pair of second baffles associated with at least one first baffle and disposed in the path of the induced air movement, the pair of second baffles being coupled to the at least one first baffle to extend outwardly relative to the central axis.

5. The lubrication system of claim 4, comprising a nozzle through which the lubricant exits to flow to the bearing, the second baffles being spaced apart to define a space in which the nozzle is disposed.

6. The lubrication system of claim 5, wherein the nozzle defines a nozzle axis extending at an angle to the bearing axis.

7. The lubrication system of claim 6, wherein each of the second baffles comprises a tang extending axially relative to the central axis and toward the bearing.

8. The lubrication system of claim 7, wherein the nozzle is disposed between the tangs.

9. The lubrication system of claim 4, wherein each of the second baffles is disposed in generally perpendicular relation to the at least one first baffle.

10. The lubrication system of claim 3, wherein each of the first baffles is configured to include apertures permitting the induced air movement to pass therethrough.

11. The lubrication system of claim 3, wherein each of the first baffles is generally planar and is disposed in generally parallel relation to the central axis.

12. A lubrication system for use with a bearing comprising an outer race, an inner race, and bearing elements disposed therebetween, the bearing defining a central axis, rotation of the bearing and a shaft journaled thereby inducing air movement having a first circumferential air velocity in a path adjacent the bearing, the lubrication system comprising:
    a structure providing a passageway through which a lubricant entrained in gas is delivered at a second velocity to the bearing, and
    a mechanical flow modifier disposed in the path adjacent to the bearing to reduce the first circumferential air velocity in the path to promote movement of the lubricant into the bearing.

13. An apparatus comprising:
    a shaft configured to rotate about a central axis,
    a bearing including an outer race, an inner race, and bearing elements disposed in a space between the outer and inner races, rotation of the bearing and the shaft journaled thereby about the central axis inducing air movement having a first circumferential air velocity in a path adjacent the bearing, and
    a nozzle disposed to dispense a lubricant entrained in gas at a second velocity into the space between the outer and inner races, and
    a mechanical flow modifier disposed in the path adjacent to the bearing to reduce the first circumferential air velocity in the path relative to the second velocity to promote movement of the gas-entrained lubricant into the bearing for lubrication of the bearing.

14. The apparatus of claim 13 wherein the bearing is formed to include a bore through which the shaft extends, the bore defines a bore diameter, the shaft rotates at an angular velocity, and the product of the bore diameter measured in millimeters and the angular velocity measured in revolutions per minute is at least 2.3 million millimeters-revolutions per minute.

15. An apparatus comprising:
    a shaft configured to rotate about a central axis,
    a bearing including an outer race, an inner race, and bearing elements disposed in a space between the outer and inner races, rotation of the bearing and the shaft journaled thereby about the central axis inducing air movement having a first air velocity and a path adjacent the bearing,
    a nozzle disposed to dispense a lubricant entrained in gas at a second velocity into the space between the outer and inner races,
    a flow modifier disposed relative to the bearing and the nozzle to modify the first air velocity relative to the second velocity to promote movement of the gas-entrained lubricant into the bearing for lubrication of the bearing, and wherein the flow modifier includes a screen structure that inhibits the induced air movement.

16. An apparatus comprising:

a shaft configured to rotate about a central axis, a bearing including an outer race, an inner race, and bearing elements disposed in a space between the outer and inner races, rotation of the bearing and the shaft journaled thereby about the central axis inducing air movement having a first air velocity and a path adjacent the bearing, a nozzle disposed to dispense a lubricant entrained in gas at a second velocity into the space between the outer and inner races, a flow modifier disposed relative to the bearing and the nozzle to modify the first air velocity relative to the second velocity to promote movement of the gas-entrained lubricant into the bearing for lubrication of the bearing, and wherein the flow modifier includes first baffles arranged in series about the central axis in the path of the induced air movement.

17. The apparatus of claim 16, wherein the flow modifier further includes a pair of second baffles disposed in the path of the induced air movement and coupled to one of the first baffles and the second baffles cooperate with one another to define a nozzle-receiving space in which the nozzle is disposed.

18. The apparatus of claim 17, wherein each of the second baffles comprises a tang extending toward the bearing and the nozzle is disposed between the tangs.

19. The apparatus of claim 18, wherein each of the second baffles comprises a base coupled to the tang of the respective second baffle and the base is configured to include apertures permitting the induced air movement to pass therethrough.

20. The apparatus of claim 17, wherein each of the second baffles is disposed generally perpendicularly to the one of the first baffles.

21. The apparatus of claim 16, wherein each of the first baffles is configured to include apertures permitting the induced air movement to pass therethrough.

22. The apparatus of claim 16, wherein each of the first baffles is generally planar and is disposed generally parallel to the central axis.

23. An apparatus comprising:

a shaft configured to rotate about a central axis, a bearing disposed about the central axis and including an outer race, an inner race coupled to the shaft and cooperating with the outer race to form a first space therebetween, and bearing elements disposed in the first space to permit rotation of the inner race relative to the outer race about the central axis, rotation of the bearing and the shaft about the central axis inducing air movement having a first air velocity and a path adjacent the bearing, lubricant dispensers spaced apart about the central axis, each lubricant dispenser being configured to include a passageway through which lubricant entrained in air flows and an outlet spaced apart from the bearing to define a second space therebetween and to dispense the air-entrained lubricant at a second velocity from the outlet into the second space toward the inner race, and a screen structure including first baffles arranged in series about the central axis and pairs of second baffles, each pair of second baffles being coupled to one of the first baffles and forming a third space, each of the outlets being disposed in one of the third spaces so that the air-entrained lubricant dispensed from the outlets reaches the inner race to lubricate the bearing.

24. The apparatus of claim 23, wherein each of the first baffles is disposed generally parallel to the shaft axis and each of the second baffles is disposed generally perpendicular to the first baffle to which it is coupled.

25. The apparatus of claim 23, wherein the first baffles cooperate with one another to define an outer boundary of an interior region, the shaft extends through the interior region, and each of the pairs of second baffles is disposed outside of the interior region.

26. The apparatus of claim 23, wherein each of the second baffles comprises a tang extending axially relative to the central axis and each outlet is disposed between the tangs of one of the pairs of second baffles.

27. The apparatus of claim 26, wherein each tang is configured to include apertures permitting the induced air movement therethrough.

28. The apparatus of claim 23, wherein the lubricant dispensers are spaced at about 90° intervals about the central axis.

29. The apparatus of claim 23, wherein the bearing is formed to include a bore through which the shaft extends, the bore defines a bore diameter, the shaft rotates at an angular velocity, and the product of the bore diameter measured in millimeters and the angular velocity measured in revolutions per minute is at least 2.3 million millimeters-revolutions per minute.

* * * * *